US010850878B2

(12) United States Patent
Donati

(10) Patent No.: US 10,850,878 B2
(45) Date of Patent: Dec. 1, 2020

(54) APPARATUS AND METHOD FOR PACKAGING SACHETS

(71) Applicant: Universal Pack S.R.L., San Giovanni in Marignano (IT)

(72) Inventor: Pietro Donati, San Giovanni in Marignano (IT)

(73) Assignee: Universal Pack S.R.L., San Giovanni in Marignano (IT)

( * ) Notice: Subject to any disclaimer, the term of this patent is extended or adjusted under 35 U.S.C. 154(b) by 35 days.

(21) Appl. No.: 16/324,392

(22) PCT Filed: Aug. 10, 2017

(86) PCT No.: PCT/IB2017/054885
§ 371 (c)(1),
(2) Date: Feb. 8, 2019

(87) PCT Pub. No.: WO2018/029630
PCT Pub. Date: Feb. 15, 2018

(65) Prior Publication Data
US 2019/0217981 A1 Jul. 18, 2019

(30) Foreign Application Priority Data
Aug. 10, 2016 (IT) .................... 102016000084468

(51) Int. Cl.
*B65B 35/42* (2006.01)
*B65B 35/02* (2006.01)
(Continued)

(52) U.S. Cl.
CPC ............. *B65B 35/42* (2013.01); *B65B 5/061* (2013.01); *B65B 35/02* (2013.01); *B65B 35/30* (2013.01);
(Continued)

(58) Field of Classification Search
CPC ......... B65B 35/02; B65B 35/42; B65B 35/30; B65B 35/44; B65B 59/00; B65B 5/061; B65G 47/082; B65G 47/841
(Continued)

(56) References Cited

U.S. PATENT DOCUMENTS 5,273,392 A * 12/1993 Bernard, II .......... B65G 1/0485
198/341.04
6,866,140 B2 * 3/2005 Iwasa ...................... B65B 5/064
198/803.13
(Continued)

FOREIGN PATENT DOCUMENTS

| EP | 0496046 A1 | 7/1992 |
|----|------------|--------|
| EP | 0967163 A2 | 12/1999 |
| EP | 2810878 A1 | 12/2014 |

OTHER PUBLICATIONS

Written Opinion of the International Preliminary Examining Authority of International Application No. PCT/IB2017/054885, dated Aug. 7, 2018, 7 pages.
(Continued)

*Primary Examiner* — Douglas A Hess
(74) *Attorney, Agent, or Firm* — Maine Cernota & Rardin

(57) ABSTRACT

Packaging apparatus of sachets comprising a primary packaging unit, a secondary packaging unit, and a transfer unit interposed between the primary and the secondary packaging units in order to transfer the sachets between the primary and secondary packaging units, wherein the transfer unit comprises at least three transfer drawers disposed one after the other, selectively movable independently along a closed-ring path between a reception station and a delivery station and vice versa, each of the transfer drawers being configured to contain a first number of sachets and the transfer unit comprising a removal member associated with the delivery station and configured to remove from one or more of the
(Continued)

transfer drawers a second number of sachets and to supply them to the secondary packaging unit. The present invention also concerns a method for packaging sachets.

14 Claims, 10 Drawing Sheets

(51) Int. Cl.
 *B65B 35/30* (2006.01)
 *B65B 35/44* (2006.01)
 *B65G 47/08* (2006.01)
 *B65G 47/84* (2006.01)
 *B65B 5/06* (2006.01)
 *B65B 59/00* (2006.01)

(52) U.S. Cl.
 CPC ............ *B65B 35/44* (2013.01); *B65B 59/001* (2019.05); *B65G 47/082* (2013.01); *B65G 47/841* (2013.01); *B65B 2220/18* (2013.01)

(58) Field of Classification Search
 USPC ............................................. 198/426; 53/475
 See application file for complete search history.

(56) References Cited

U.S. PATENT DOCUMENTS

| | | | |
|---|---|---|---|
| 7,104,027 B2* | 9/2006 | Ford | B65B 5/106 53/237 |
| 7,134,258 B2* | 11/2006 | Kalany | B65B 35/24 53/473 |
| 7,654,062 B2* | 2/2010 | Mueller | B65B 5/08 53/251 |
| 8,448,776 B2* | 5/2013 | Papsdorf | B65B 5/106 198/370.08 |
| 8,695,779 B2* | 4/2014 | Hawkes | B25J 15/0014 198/347.1 |
| 9,540,127 B2* | 1/2017 | Papsdorf | B65B 59/005 |
| 9,573,771 B2* | 2/2017 | Papsdorf | B65B 59/005 |
| 9,580,254 B2* | 2/2017 | Papsdorf | B65B 35/30 |
| 9,663,305 B2* | 5/2017 | Papsdorf | B65B 35/44 |
| 10,421,572 B2* | 9/2019 | Moncrief | B65B 5/06 |
| 2003/0136086 A1 | 7/2003 | Kalany et al. | |
| 2006/0070349 A1 | 4/2006 | Ford et al. | |
| 2012/0234647 A1 | 9/2012 | Papsdorf et al. | |
| 2014/0352261 A1* | 12/2014 | Bellante | |

OTHER PUBLICATIONS

International Search Report of International Application No. PCT/IB2017/054885, dated Oct. 17, 2017, 10 pages.

* cited by examiner

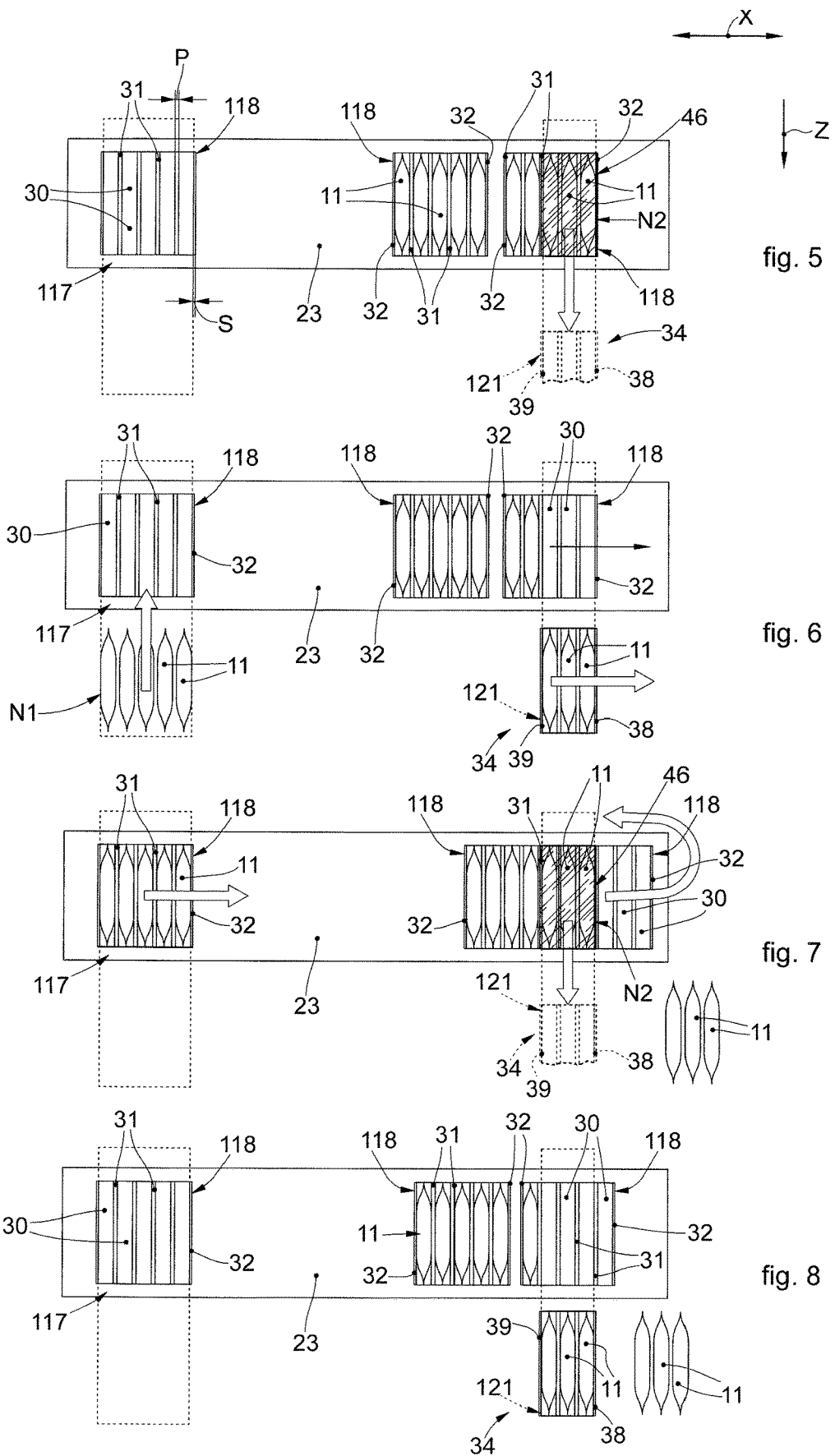

APPARATUS AND METHOD FOR PACKAGING SACHETS

RELATED APPLICATIONS

This application is a national phase application filed under 35 USC § 371 of PCT Application No. PCT/IB2017/054885 with an International filing date of Aug. 10, 2017, which claims priority of IT Patent Application 102016000084468 filed Aug. 10, 2016. Each of these applications is herein incorporated by reference in its entirety for all purposes.

FIELD OF THE INVENTION

The present invention concerns an apparatus for packaging sachets which allows to group together, on each occasion, a predefined and variable number of sachets to be inserted into packages, and to a connected method for packaging sachets.

The sachets in question can contain different types of solid, liquid or powdered products, such as, merely by way of example, medicines, supplements, foods, granules, seeds, creams, detergents or other.

BACKGROUND OF THE INVENTION

Apparatuses for packaging sachets are known, which comprise primary packaging units, in which loose products are measured and packaged into sachets, also called primary packagings in the specific field, and secondary packaging units, in which groups of sachets are inserted into packs, or boxes, also called secondary packagings in the specific field.

Known packaging apparatuses, see FIG. 1 for example, normally comprise a transfer unit 14 for transferring the sachets 11 from the primary packaging unit 12 to the secondary packaging unit 13.

The transfer unit 14 is provided with a reception station 17 of the sachets 11 arriving from the primary packaging unit 12 and with a delivery station 21 of the sachets 11 to the secondary packaging unit 13.

In particular, the primary packaging unit 12 provides, by means of operating lines 16, to the reception station 17, on each occasion, a defined quantity of sachets 11.

Downstream of each operating line 16, there are transfer drawers 18 cooperating with the reception station 17, in each of which the sachets 11 are positioned.

The transfer drawers 18 are configured to transfer the sachets 11 from the reception station 17 to the delivery station 21, so that they can be inserted into the package 40 at the secondary packaging unit 13.

The transfer drawers 18 are normally standardized according to the final requirements, so as to contain the same number of sachets 11 to be positioned in the package 40, or a smaller number.

It is quite clear that if the transfer drawers 18 contain the same number of sachets 11 to be inserted into the package 40, there are no filling problems.

If the transfer drawers 18 contain a lower number of sachets 11 than the quantity of sachets 11 for which they are sized, various filling problems arise.

In this case, besides having a reduction in transfer efficiency, the sachets 11 are subjected to unwanted movements in the transfer drawer 18 which can cause blockages and/or incorrect positioning.

If the number of sachets 11 that can be contained in the package 40 is greater than the number of sachets 11 that can be transferred from each transfer drawer 18, the secondary packaging unit 13 is normally provided with housing drawers 19, in which the sachets 11 coming from successive transfer drawers 18 are grouped together.

Once a predetermined quantity of sachets 11 has been reached in the housing drawers 19, the sachets 11 are supplied to the secondary packaging unit 13 for insertion into the packages 40.

Obviously, these known solutions allow to obtain an effective packaging of the sachets 11 in the packages only if the number of sachets 11 to be inserted in the packages 40 substantially corresponds to the number of sachets 11 contained in each transfer drawer 18, or is a multiple thereof.

If a substantial modification of the number of sachets 11 to be inserted into the packages 40 is required, said known apparatus requires a substantial modification of the functional components, at least of the transfer unit 14.

This causes high machine downtimes, with a consequent reduced productivity and makes it impracticable to produce packages 40 with varying quantities of sachets in succession.

Various embodiments of packaging apparatuses known in the art are also described in the prior art documents US-A1-2003/0136086, EP-A1-0.967.163, US-A1-2006/0070349, EP-A1-2.810.878, EP-A1-0.496.046, and US-A1-2012/0234647.

These documents describe packaging systems comprising transfer elements shaped like drawers or fins and configured to transfer objects from one or more feed lines to a delivery line for packaging the objects themselves. Some of these known solutions comprise transfer members, for example one or more thruster elements, which are configured to transfer the objects from the transfer elements to the delivery line.

The solutions described in the prior art documents listed above also have some disadvantages.

Some of these packaging apparatuses are structurally very complex, and consequently they are very bulky and expensive.

Apparatuses known in the state of the art have limited productivity because they comprise a small number of feed lines for the objects, with a consequent maximum limit on the number of objects that can be transferred in a unit of time.

Another disadvantage of some of the apparatuses known in the state of the art, and of the methods they implement, is that they are not versatile and flexible. In fact, they do not allow to efficiently manage the change of format of the cartons or packages, with a consequent change in the number of objects contained therein. A change in the number of objects to be transferred entails long and complicated operations of structural and functional adjustments of the packaging apparatuses, including for example changes to some of the elements comprised in the apparatus, in particular the removal member, and/or the program to control the operation of the apparatus. It should also be noted that these operations can cause the apparatus to stop, or require a temporary change in the cadence of the machine upstream or downstream, which is particularly disadvantageous because the transitory steps of stopping and restarting, or changes to the cadence, in this type of packaging apparatuses, generate a lot of waste, or defective objects. In fact, in the case of cadence variations, objects can be received from the upstream machine which have already been worked, for example heat sealed, with different parameters of temperature and pressure from production conditions at nominal speed.

Another disadvantage of some of the solutions described in the above documents is that they do not allow to manage, in a precise and reliable way, the transfer of a large number of objects, for example eight or more objects, in particular, if they are to be transferred simultaneously by two or more transfer elements disposed contiguously one after the other.

Another disadvantage of most of the solutions described in the above documents is that they provide to transfer the objects in a sequential and non-simultaneous manner, which requires bulkier and structurally more complicated apparatuses.

There is therefore a need to perfect the state of the art and to make available an apparatus and a method for packaging sachets that overcome at least one of the disadvantages of the state of the art.

The purpose of the present invention is to obtain an apparatus for packaging sachets that is extremely versatile, allowing to change the number of sachets to be inserted into packages rapidly and without interrupting productivity.

Another purpose of the present invention is to reduce and even to eliminate problems of blockages and/or unwanted movement of the sachets, for example during transfer.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns a packaging apparatus that comprises:
- a primary packaging unit configured to supply the sachets containing a product;
- a secondary packaging unit configured to introduce the sachets into packages;
- a transfer unit interposed between the primary packaging unit and the secondary packaging unit in order to transfer the sachets from the primary packaging unit to the secondary packaging unit.

According to one aspect of the present invention, the transfer unit comprises at least three transfer drawers disposed one after the other, selectively movable by means of respective actuators independently with respect to each other along a closed-ring path between a reception station and a delivery station and vice versa.

According to possible embodiments, each of the transfer drawers is configured to contain a first number of sachets and the transfer unit comprises a removal member associated with the delivery station and configured to remove from one or more transfer drawers a second number of sachets and to supply them to the secondary packaging unit.

According to possible embodiments, the packaging apparatus according to the present invention comprises an electronic management unit that coordinates and commands the movement of the transfer drawers in a coordinated manner with respect to each other and with the movement of the removal member. In possible implementations, the electronic management unit is configured to command the actuators so that they take at least one of the transfer drawers in correspondence with the delivery station into a position in which an active transfer portion comprised in said at least one transfer drawer is operatively aligned with the removal member. The active transfer portion is that portion of one or more of the transfer drawers in which the second number of sachets is contained. The possible remaining sachets contained in the transfer drawer, surplus with respect to the second number, that is, the difference between the first number of sachets and the second number of sachets, are contained in a zone of the transfer drawer outside said active transfer portion.

In possible implementations, the active transfer portion extends partly on one transfer drawer and partly on another transfer drawer, disposed adjacent to the first in the delivery station.

In some embodiments, the packaging apparatus comprises three transfer drawers. This is advantageous since it has been verified that this number of transfer drawers is the minimum number so that one of the transfer drawers is available in the reception station, while the remaining two drawers can be engaged in the delivery station.

Thanks to this configuration, the packaging apparatus allows to always have a transfer drawer in the reception station ready to receive the sachets from the primary packaging unit, so as not to slow down and/or interrupt its functioning.

According to the present invention, the packaging apparatus allows to put two transfer drawers adjacent in the delivery station in order to remove the sachets also from both the transfer drawers at the same time, so as to be able to deliver, on each occasion, a second number of sachets to the secondary packaging unit.

This solution, in one embodiment, allows to dynamically and continuously vary the number of sachets to be inserted into the packages, without substituting parts of the apparatus, or interrupting the apparatus for prolonged periods of time.

The packaging apparatus and method according to the invention are versatile and flexible since they allow to transfer any second number of sachets from the transfer drawers to the secondary transfer unit, without that second number being limited in any way, either by the first number of sachets contained in each transfer drawer, or by the number of sachets transferred from the delivery device to the transfer drawers in correspondence with the reception unit. In other words, in the reception station, at every cycle, a certain number of sachets can be transferred to the transfer drawers, a number that can be equal to or different from the first number of sachets contained in each transfer drawer, numbers that in their turn can be equal to or different from a second number of sachets that have to be removed from one, or possibly two, transfer drawers in order to be transferred to the secondary packaging unit.

BRIEF DESCRIPTION OF THE DRAWINGS

These and other characteristics of the present invention will become apparent from the following description of some embodiments, given as a non-restrictive example with reference to the attached drawings wherein:

FIGS. 5-8 schematically show a possible sequence of a packaging method according to the present invention;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
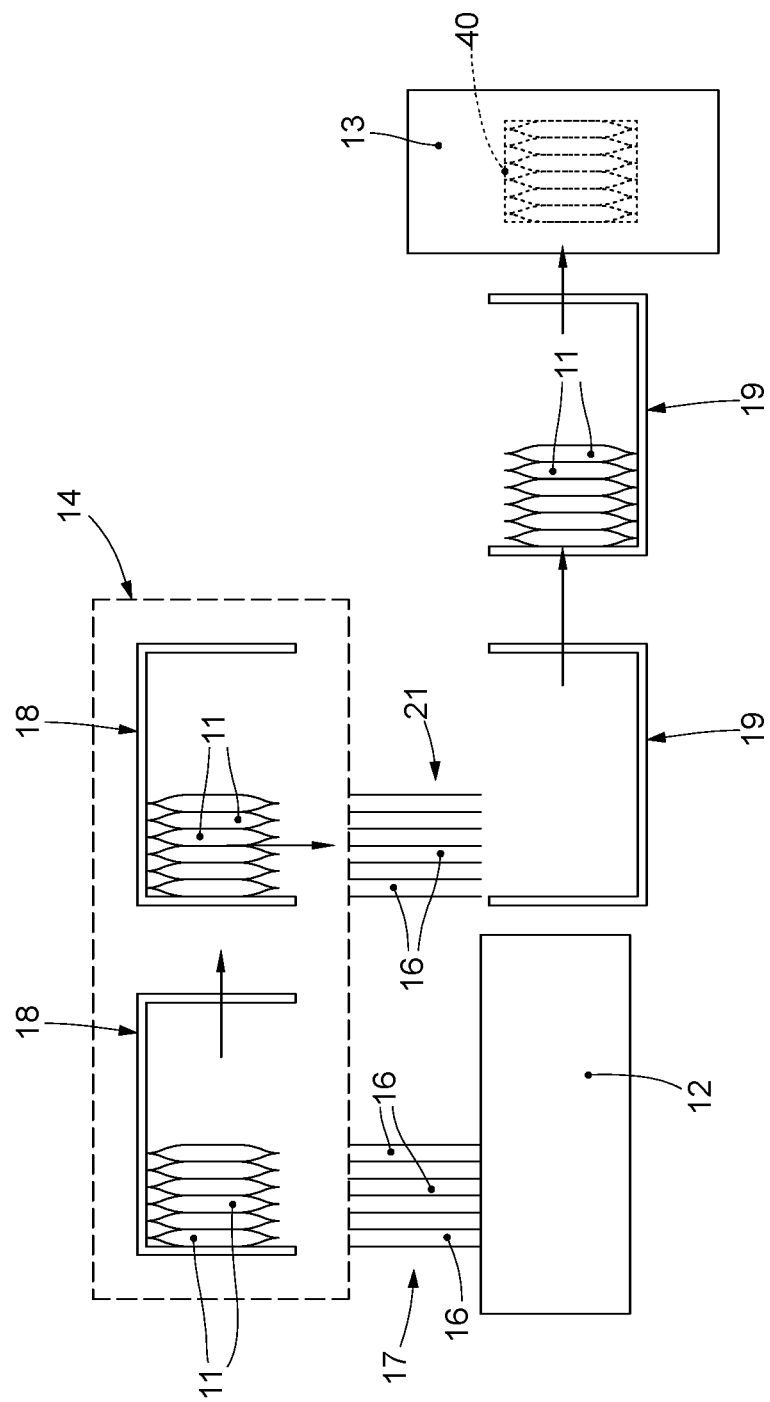
FIG. 1 schematically shows a known packaging apparatus.

With reference to FIGS. 2-12, which show non-limiting examples of the invention, we will now describe embodiments of a packaging apparatus 10 of sachets 11 containing solid, liquid or powdered products such as, for example, medicines, supplements, foods, granules, seeds, creams, detergents or other.

The sachets 11 can have various shapes, such as for example rectangular, stick-shaped, square, or other type, depending on their content and/or production needs. By way of non-restrictive example, two or more sachets 11 can be separable and connected to each other, for example by means of a tear-off connection portion or other type. In this case, the sachets 11 are also referred to as coupled sachets 11.

The sachets 11 containing a product have a certain thickness that defines a lateral edge of the sachets 11. According to possible embodiments, the sachets 11 can be moved edge-wise, that is, by moving the sachets 11 with their side of the lateral edge resting on the movement plane.

According to possible embodiments, the packaging apparatus 10 can comprise:
- a primary packaging unit 12 configured to supply sachets 11 containing a product;
- a secondary packaging unit 13 configured to introduce the sachets 11 into packages 40;
- a transfer unit 114 interposed between the primary packaging unit 12 and the secondary packaging unit 13 for transferring the sachets 11 from the primary packaging unit 12 to the secondary packaging unit 13.

According to possible embodiments, not shown, the primary packaging unit 12 can comprise devices for cutting, shaping and forming the casing of the sachet 11, devices for measuring the loose product to be introduced into the sachet 11, and a device to seal the casings with measured products to form sachets 11.

According to possible embodiments, the primary packaging unit 12 can comprise a delivery device 15 of the sachets 11, disposed at exit from the primary packaging unit 12.

The delivery device 15 of the sachets 11 is configured to supply a plurality of sachets 11, also coupled, to the transfer unit 114.

The delivery device 15 can be configured to supply a plurality of sachets 11 simultaneously and in a cadenced manner to the transfer unit 114.

According to possible embodiments, the delivery device 15 of the sachets 11 can comprise one or more operating lines 16 along which the sachets 11 can slide until they reach the transfer unit 114.

In a possible embodiment, the delivery device 15 comprises a number N* of operating lines 16 so that with every operating cycle, a number N* of sachets 11 can be conveyed simultaneously to the transfer unit. The operating lines 16 can provide one or more movement members able to make the sachets 11 slide along the path defined by them. For example, the movement members can comprise suction means, drawing rollers, or other members able to move the sachets 11 along the paths defined by each operating line 16.

In particular, with reference to the drawings, the delivery device 15 can be configured to transfer the sachets 11 edge-wise, moving them with their side of the lateral edge resting on the movement plane.

According to possible embodiments, the packaging apparatus 10 is configured to dispose, move and package the sachets 11 keeping them edge-wise. This allows to optimize the spaces since more sachets 11 can be moved than if they were stacked. In fact, moving the sachets 11 edge-wise does not have the disadvantage that they slide when they are stacked one on the other.

In this case, the operating lines 16 have channels conformed to allow the sachets 11 to slide inside, and having lateral sizes substantially a little bigger than the thickness of the sachets 11, or in the case of coupled sachets 11, a little bigger than the thickness of several sachets 11, so that one or more sachets 11 can be passed simultaneously in the same operating line 16.

According to possible embodiments, the transfer unit 114 can comprise a reception station 117 located downstream of the primary packaging unit 12 or downstream of the operating lines 16.

The reception station 117 defines a region where the sachets 11 are transferred from the primary packaging unit 12 to the transfer unit 114 by means of the operating lines 16 with an established cadence.

According to the present invention, the transfer unit 114 can comprise at least three transfer drawers 118 disposed one after the other, selectively movable independently along a closed-ring path T between the reception station 117 and a delivery station 121.

In possible solutions, the transfer drawers 118 can all have the same capacity of sachets 11. This allows to simplify the time management for controlling the packaging units 12 and 13.

As will be clear from the description, one of the transfer drawers 118 provided in the transfer unit 114 can be positioned in the reception station 117 on each occasion, so as to receive a first number N1 of sachets 11 arriving from the primary packaging unit 12.

In possible implementations, the first number N1 of sachets 11 contained in each transfer drawer 118 can be equal to the number N* of sachets 11 which in the reception station 117 are transferred, at each cycle, from the delivery device 15 to the transfer unit 14.

In possible embodiments, the number of sachets N* which are transferred in the reception station 117 at each cycle from the delivery device 15 to the transfer unit 114 can be lower than the first number N1 of sachets 11 which can be contained in each transfer drawer 118. For example, each transfer drawer 118 is sized so that it can contain, as a maximum capacity, a first number N1 of sachets 11 equal to a multiple of the number N* of sachets 11 which with each cycle are transferred from the delivery device 15 to the transfer unit 114 in order to have only three transfer drawers 118, and not a larger number of drawers. In this case, it is therefore provided that the filling of each transfer drawer 118 in the reception station 117 is carried out with a plurality of temporally successive feeds or cycles of the sachets 11 arriving from the primary packaging unit 12.

According to possible embodiments, the secondary packaging unit 13 can comprise a plurality of housing drawers 119, into each of which, on each occasion, a second number N2 of sachets 11 can be transferred.

According to another aspect of the present invention, the transfer unit 114 can comprise a removal member 33 associated with the delivery station 121 and configured to remove, from one or more of the transfer drawers 118, the second number N2 of sachets 11 and to supply it to the secondary packaging unit 13.

According to possible embodiments, the housing drawers 119 can be disposed on a movement member 20 such as for example a closed-ring conveyor belt T or other similar and/or comparable movement member able to position, on each occasion, a housing drawer 119 in the desired position.

In particular, the movement member 20 can position a housing drawer 119 in the delivery station 121 on each occasion.

According to possible embodiments, the transfer unit 114 can comprise a delivery station 121 located upstream of the secondary packaging unit 13.

The delivery station 121 defines a region where the sachets 11 are transferred to the secondary packaging unit 13 by inserting them in succession into one of the housing drawers 119 positioned in a cadenced manner in the delivery station 121.

In particular, the movement member 20 defines the cadence at which the second number N2 of sachets 11 can be transferred in succession to the individual housing drawers 119.

According to possible embodiments, the transfer unit 114 can comprise at least three transfer drawers 118 disposed one in succession to the other.

In a preferred embodiment, the transfer unit 114 comprises three transfer drawers 118.

According to possible embodiments, the first number N1 and/or the second number N2 of sachets 11 can be predetermined and also varied during the functioning of the packaging apparatus 10.

Figure 2:
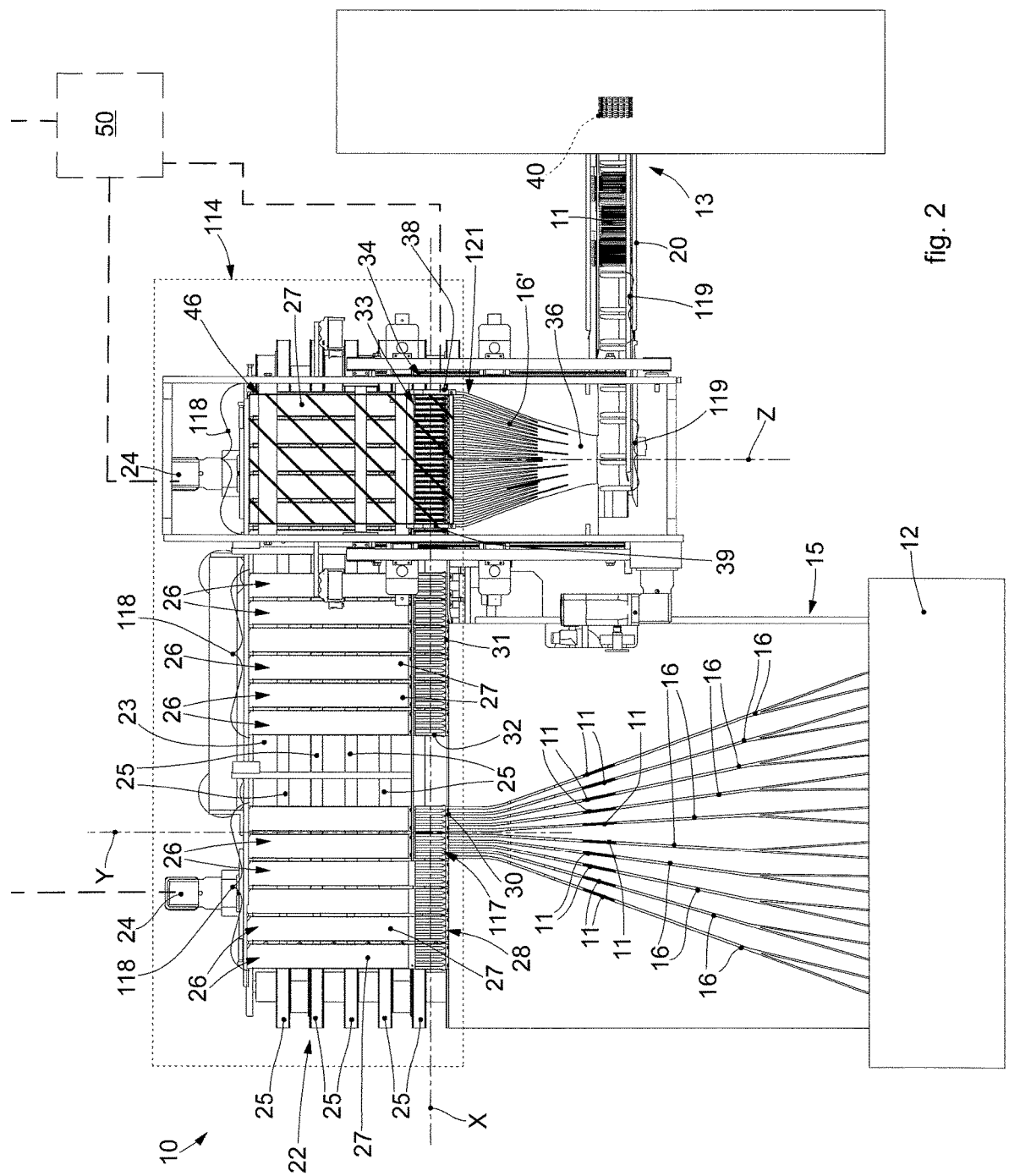
FIG. 2 is a view from above of a packaging apparatus according to the present invention.
Figure 3:
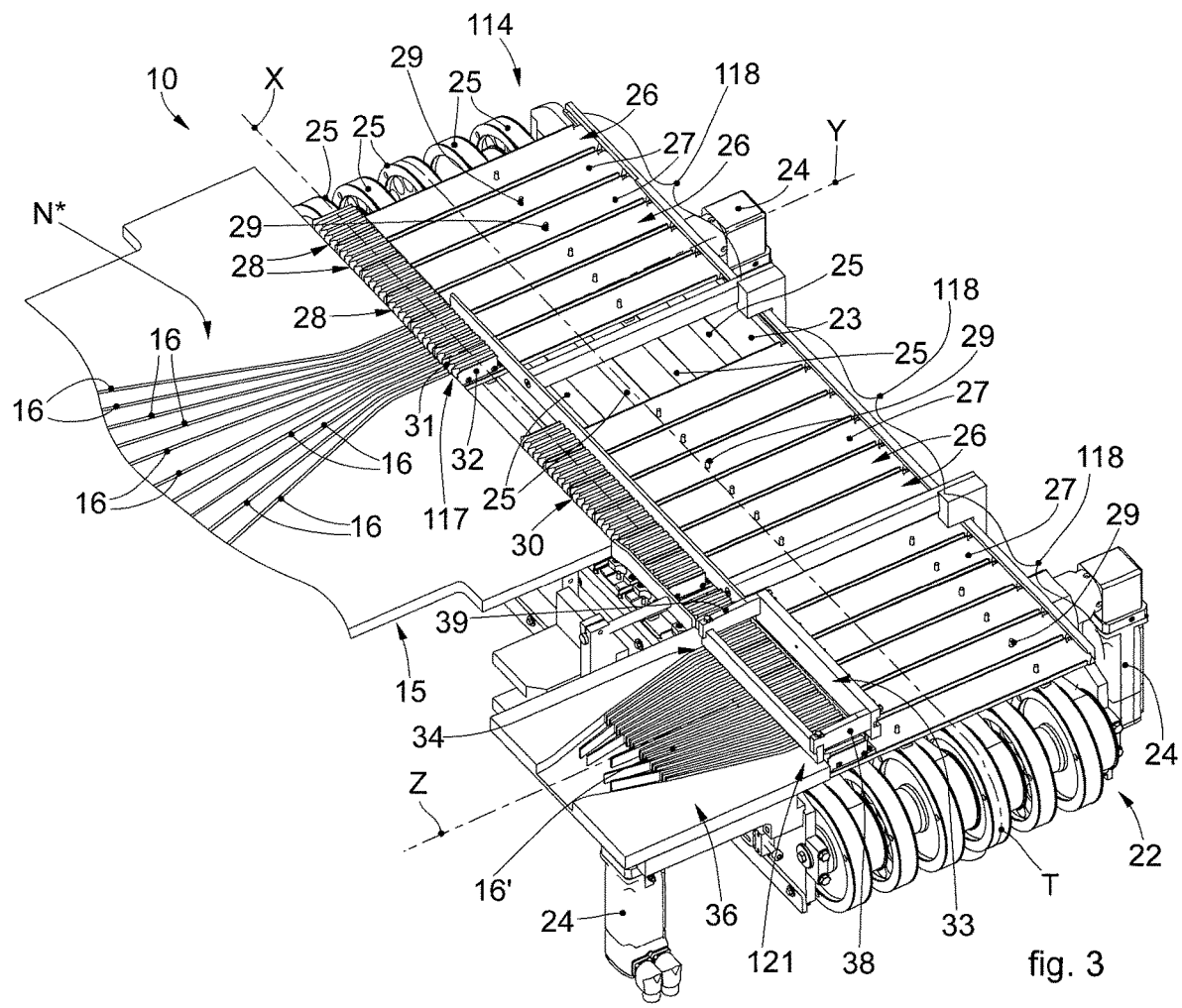
FIG. 3 is a perspective view of a packaging apparatus according to the present invention.

These operations can be carried out by an electrical and/or electronic management unit 50, shown schematically in FIGS. 2 and 9, which coordinates and commands the various components of the packaging apparatus 10. In particular, the electronic management unit 50 commands the movement of the transfer drawers 118 in a coordinated manner with the movement of the removal member 33 and so that the different transfer drawers 118 are moved in a coordinated manner with respect to each other.

In possible implementations, the electronic management unit 50 is configured to command the actuators 24 that move the transfer drawers 118 independently of each other. In particular, the electronic management unit 50 is configured to command the actuators 24 so that they take at least the corresponding transfer drawer 118 which is temporarily disposed in correspondence with the delivery station 121 to a position such that an active transfer portion 46 comprised in the transfer drawer 118 is operatively aligned with the removal member 33.

The active transfer portion 46, indicated by a shaded background in FIGS. 2, 5-12, and 14, is that portion of the transfer drawer 118 in which the second number N2 of sachets is contained. Any remaining sachets contained in the transfer drawer 118 exceeding the second number N2, that is, the difference between the first number of sachets N1 and the second number of sachets N2, are contained in an area of the transfer drawer 118 outside the active transfer portion 46.

In some embodiments, the electronic management unit 50 is a programmable control unit, known in the state of the art.

According to some embodiments, which can be combined with other embodiments, the second number N2 of sachets 11 can also be varied, on each occasion, from one housing drawer 119 to the next.

The first number N1 can be greater than or equal to number N2. In the latter case, in the delivery station 121, a single transfer drawer 118 is initially disposed and then, possibly, the next transfer drawer 118 is put adjacent in order to transfer from both transfer drawers 118 simultaneously the second number N2 of sachets 11 required. In this case, shown by way of example in FIG. 7, the active transfer portion 46 extends partly on one transfer drawer 118 and partly on the next transfer drawer 118 disposed adjacent to the first in the delivery station 121.

If the first number N1 is smaller than the second number N2, the apparatus provides to initially put several transfer drawers 118 adjacent in the delivery station 121.

According to possible embodiments, the primary packaging unit 12 is configured to transfer the first number N1 to a transfer drawer 118 and the removal member 33 is configured to transfer the second number N2 to a housing drawer 119.

These transfer operations can be carried out simultaneously or independently of each other.

This allows to have a third transfer drawer 118 disposed between the other two, which is already ready for the subsequent transfer of sachets 11.

According to possible embodiments, the transfer drawers 118 can be selectively movable independently along a closed-ring path T, so as to take the transfer drawers 118 in succession from the reception station 117 to the delivery station 121 and from the delivery station 121 to the reception station 117, or vice versa.

According to possible embodiments, the transfer drawers 118 can be moved by means of a movement member 22 that defines the closed-ring path T along which the transfer drawers 118 can be disposed.

In particular, according to a possible embodiment, the movement member 22 can comprise a transfer plane 23, where the transfer drawers 118 can be disposed in succession to receive the sachets 11 from the delivery device 15 and to deliver the sachets 11 to the housing drawer 119.

These possible solutions also allow to have one or more transfer drawers 118 comprised between the reception station 117 and the delivery station 121.

This allows to guarantee continuous production in every case, since there is always a transfer drawer 118 available with sachets 11 ready to be delivered to the housing drawer 119.

This solution allows to regulate the transfer of sachets 11 by the transfer unit 114, so as to coordinate the supply cycles of the primary packaging unit 12 with the delivery cycles of the secondary packaging unit 13.

In particular, the Applicant has optimized the number of transfer drawers 118 so that operating continuity of the two packaging units 12 and 13, can be maintained, coordinating their cadences and containing costs.

In fact, by regulating movement times and the reception/delivery times of the sachets 11 and the positioning times of at least three transfer drawers 118, it is possible to maintain operational continuity, supplying, on each occasion, a desired second number N2 of sachets 11.

This allows to size the housing drawers 119 so that they always contain the correct number of sachets 11 at each transfer, thus avoiding problems related to the partial filling of the housing drawer 119.

According to possible embodiments, the transfer unit 114 can be configured to move the sachets 11 in a transfer direction X. For example, said direction can be defined above the transfer plane 23.

According to possible embodiments, the transfer unit 114 receives the sachets 11 from the primary packaging unit 12 in a reception direction Y and delivers the sachets 11 to the secondary packaging unit 13 in a delivery direction Z. The reception Y and delivery directions Z can be disposed perpendicular to the transfer direction X.

This solution allows to contain the bulk of the packaging apparatus 10 and to position the primary and secondary packaging units 12 and 13 on the same side or on opposite sides with respect to the transfer direction X.

According to possible embodiments, other configurations or layouts of the packaging apparatus 10, 10' are naturally possible, for example, more compact, in which the sachets 11 follow a closed path, for example of a substantially triangular shape. In this case, the primary 12 and secondary 13 packaging units are facing on different sides of the triangle.

The movement member 22 can comprise an actuator 24 for each transfer drawer 118 so that it can drive them independently.

For example, the actuators 24 can comprise a motor member, or other type of actuators possibly including motion conversion kinematisms, to obtain movement along the closed-ring path T.

According to possible embodiments, the movement member 22 can comprise for each transfer drawer 118 a mobile element 25 connected to the actuator 24, and by means of which the action of the actuator 24 is transferred to the transfer drawer 118 in the transfer direction X.

According to possible variants, the movement member 22 can comprise a linear magnetic or electromagnetic movement member, along which the transfer drawers 118 are mobile in an independent and controlled manner.

These configurations allow to move, and if necessary to selectively position, each transfer drawer 118 along the closed-ring path T, or also along the transfer plane 23.

For example, the mobile element 25 can comprise one or more pairs of conveyor belts, transfer belts, return elements of the motion supplied by the actuator 24 and/or other similar and/or comparable devices.

According to possible embodiments, two transfer drawers 118 can be disposed along the mobile element 25 which, during use, can be located in correspondence with opposite ends of the transfer unit 114.

In this way, at least one transfer drawer 118 is always available in position, ready in the delivery station 121, and another transfer drawer 118 in the reception station 117.

This allows to avoid down times and to speed up production in the case of rapid cadences.

According to possible embodiments, each transfer drawer 118 can comprise at least two transfer sectors 26 each configured to transfer a plurality of sachets 11, less than the first number N1.

According to possible embodiments, the transfer sectors 26 can be reciprocally connected in an articulated manner, to follow said closed-ring path T.

One of the advantages of these embodiments is that they allow the transfer sectors 26 to slide easily even close to a curvature of the closed-ring path T.

The transfer sectors 26 can be moved in groups, that is, so that they are adjacent, so as to form a transfer drawer 118.

Each transfer sector 26 can comprise a connection portion 27, mechanically connected to the mobile element 25, and a housing portion 28 where the sachets 11 are positioned. For example, the transfer sectors 26 can comprise a connection portion 27 defined by a metal bar or other similar element.

Attachment elements 29, such as pins, nails, worm screws, screws or other, can be applied to the connection portion 27, to connect the latter to the corresponding mobile element 25.

This embodiment allows to separate the area where the sachets 11 are positioned from that where the transfer sector 26 is moved.

In particular, this solution allows to prevent unwanted oscillations and/or offsets of the transfer sectors 26 during movement, so that the transfer sectors 26 are kept correctly oriented in the reception and delivery direction of the sachets 11.

According to possible embodiments, the housing portions 28 can comprise a plurality of housing seatings 30, in each of which a single or coupled sachet 11 can be housed.

According to possible embodiments, each of the transfer drawers 118 can be provided with lateral walls 32 and dividing walls 31 disposed between said lateral walls 32.

According to some embodiments, the lateral walls 32 and the dividing walls 31 define housing seatings 30 configured to house one or more sachets 11.

According to possible embodiments, the lateral walls 32 can have an equivalent thickness S which can be substantially half the equivalent thickness P of the dividing walls 31.

According to possible embodiments, at least two transfer sectors 26 are provided with dividing walls 31 and with at least two mating portions of the dividing walls 31 located laterally to each transfer sector 26, each portion having an equivalent thickness S.

Thanks to these features, it is possible to distance the housing seatings 30 at a constant pitch between at least two adjacent transfer sectors 26.

By equivalent thickness we mean the thickness defined by the maximum width of the lateral wall 32 or of the dividing wall 31.

In this way, it is certain that during the delivery of the sachets 11 from two adjacent transfer drawers 118, a second precise number N2 of sachets 11 will be removed without any blockages and/or malfunctions occurring.

According to possible embodiments, the sachets 11 can be transferred in sequence to the transfer drawer 118 disposed in the reception station 17, or can be transferred in groups with a lower number than the first number N1 in the individual transfer sectors 26.

Advantageously, the transfer drawer 118 in the reception station 117 is completely filled with sachets 11 so that subsequently the second number N2 of sachets 11 can be transferred to the delivery station 121.

In fact, with a transfer drawer 118 always complete with sachets 11 available, it is possible to position the latter adjacent to another partly empty transfer drawer 118 in the delivery station 121. In this way a second number N2 of sachets 11 can be delivered on each occasion.

Figure 4:
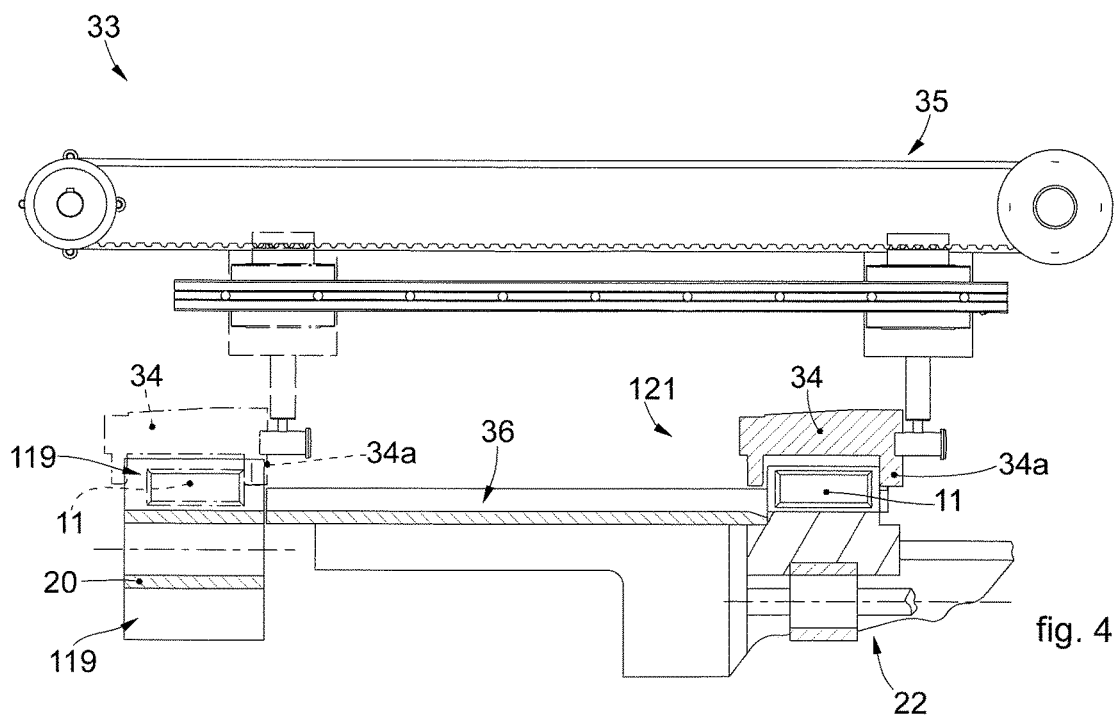
FIG. 4 shows a detail of a packaging apparatus according to the present invention.
Figure 9A:
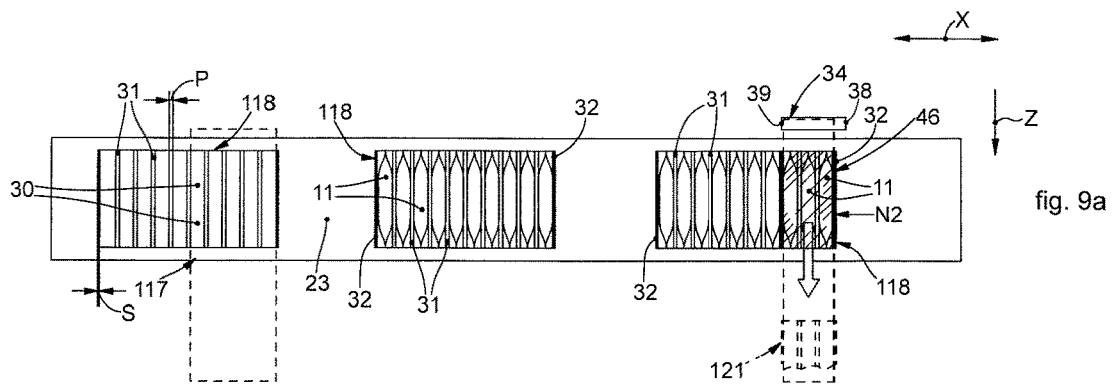
FIGS. 9A-9D, 10A-10D, 11A-11D, 12A-12D schematically show other possible operating sequences of different implementations of a packaging method according to the present invention.
Figure 9B:
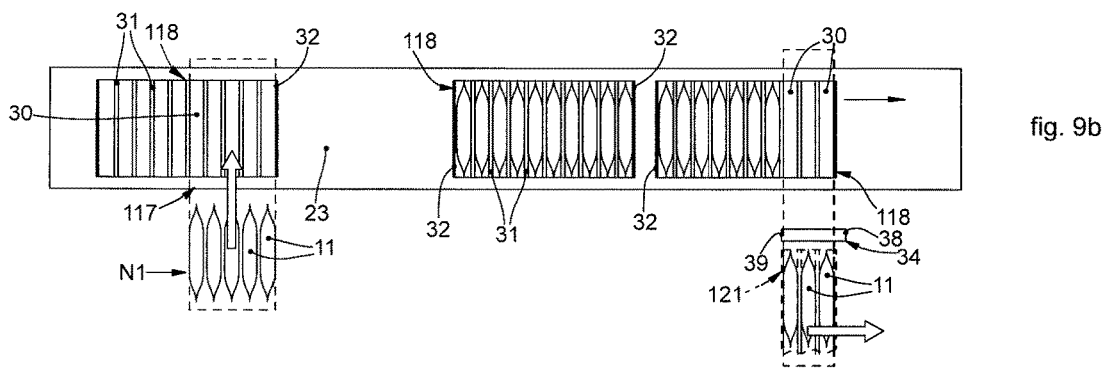
Figure 9C:
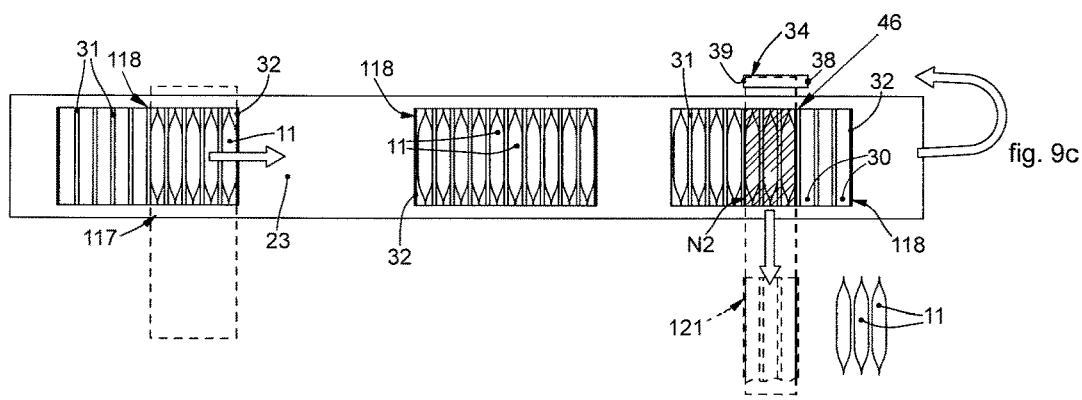
Figure 9D:
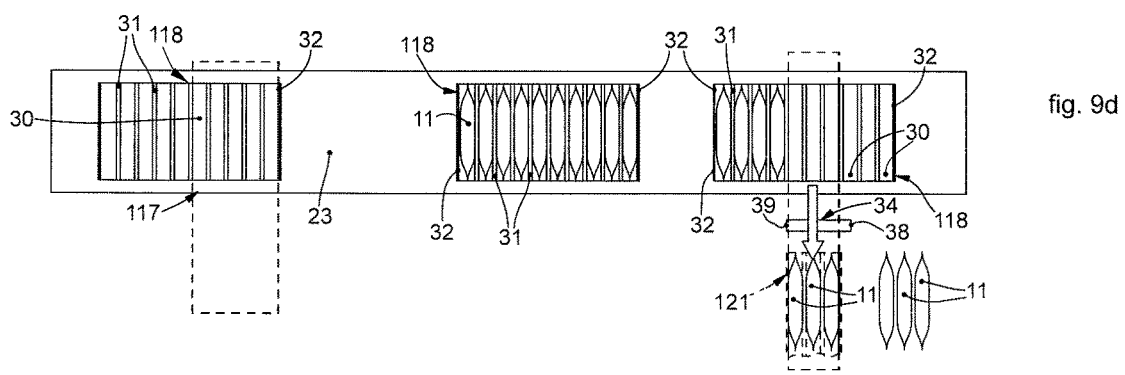

According to possible embodiments shown in FIG. 4, the removal member 33 can comprise a removal element 34 to act on at least one upper portion of the sachets 11, and at least one movement device 35 configured to move the removal element 34 from the delivery station 121 to the secondary packaging unit 13.

The removal element 34 can be temporarily associated with an upper portion of the sachets 11 positioned in the housing seatings 30, so as to keep them edge-wise during their transfer to the secondary packaging unit 13.

The width of the removal element 34 is defined by the reciprocal distance between its two opposite lateral walls, measured in a direction substantially parallel to the transfer direction X. The removal element 34 comprises a first lateral wall 38 and a second lateral wall 39, which are respectively disposed at a greater and lesser distance from the reception station 117. The lateral walls 38, 39 can extend parallel to the delivery direction Z, and hence transverse, in particular orthogonal, to the transfer direction X.

According to possible embodiments, the removal element 34 can have a fixed size to remove a number of sachets 11 defined on each occasion by the positioning of one or more transfer drawers 118 in the delivery station 121.

In this case, the removal element 34 cannot be replaced since the definition of the second number N2 of sachets 11 is guaranteed by the positioning of the transfer drawer or drawers 118 in the delivery station 121. According to possible embodiments, the removal element 34 can have a defined width to remove a second desired number N2 of sachets 11. It is intended that said second number N2 of sachets 11 is the maximum number of sachets that the removal element 34 is able to remove. In particular, according to the width of the removal element 34, the desired quantity of sachets 11 positioned in the delivery station 121 is removed.

The removal element 34 can also remove part of the sachets 11 positioned in the delivery station 121 according to packaging requirements. In particular, the removal element 34 can be provided with an abutment portion 34*a* such as to draw the sachets 11 when it comes into contact therewith.

In alternative embodiments, the removal element 34 can be "in format", that is, it can have a suitable extension to remove the second number N2 of sachets 11 provided. When the second number N2 of sachets 11 is changed, in this case it is provided to replace the removal element 34 with another, with a size suitable to remove the second number of sachets 11, that is, having a greater extension if the second number N2 of sachets is higher, and a smaller extension if the second number N2 of sachets is smaller.

The removal element 34 is configured to remove, from one or more transfer drawers 118 simultaneously, a second number N2 of sachets 11 and supply them to the secondary packaging unit 13.

In particular, the removal element 34 can be associated with an upper portion of the sachets 11 and then draw the sachets 11 along a delivery plane 36.

The delivery plane 36 is disposed in the delivery station 121 and can comprise a plurality of further operating lines 16' to convey the sachets 11 arriving from one or more transfer drawers 118 to a housing drawer 119. Advantageously, the further operating lines 16' allow to compact the sachets 11 with each other so, as to organize their disposition in such a way as to optimize spaces and volumes so that they can be introduced into the housing drawer 119 in an orderly manner.

Once the sachets 11 have been delivered in the housing drawer 119, the removal element 34 is returned to the starting position so that it can remove other sachets 11.

Figure 13:
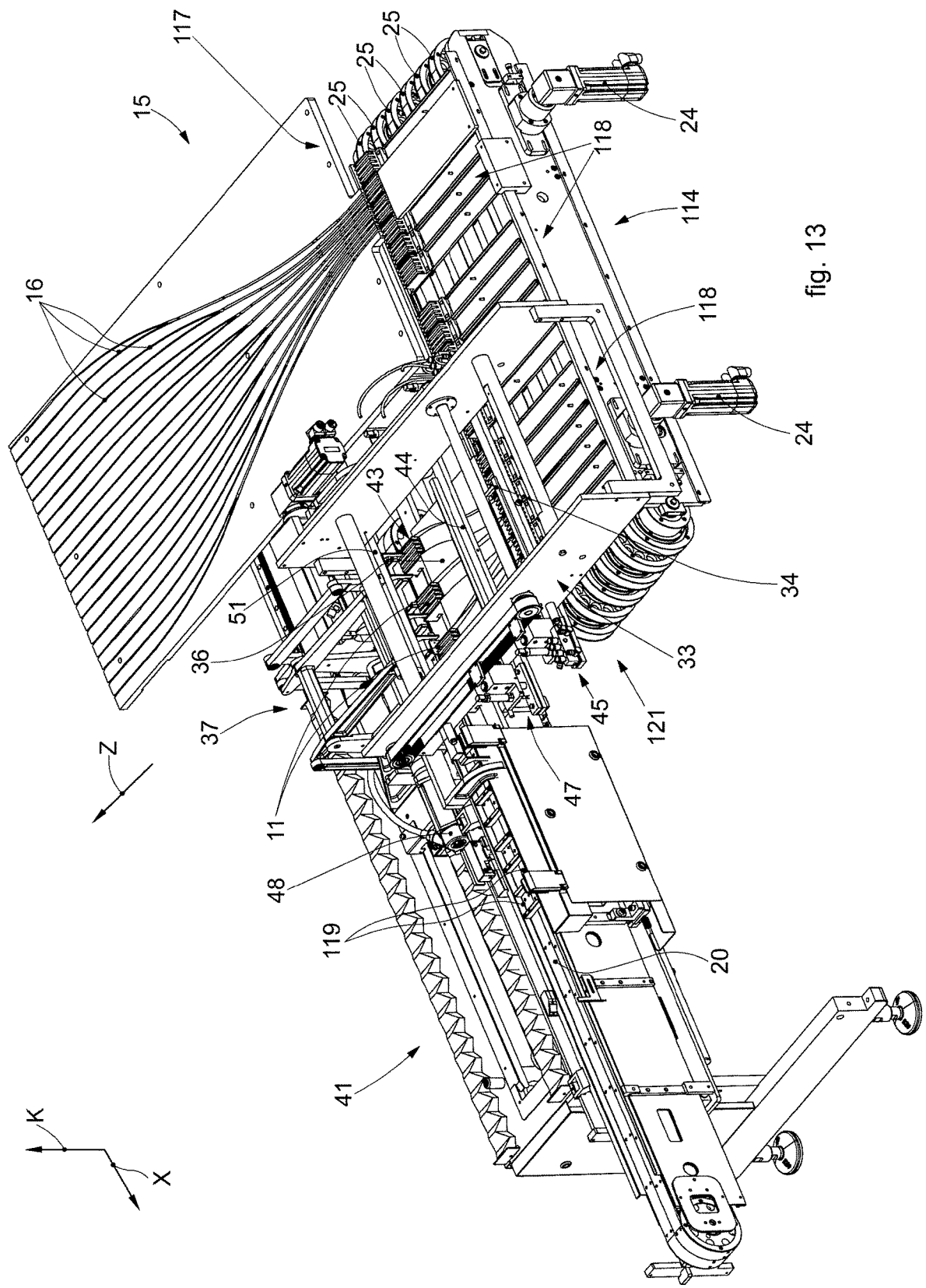
FIG. 13 is a perspective view of a variant of a packaging apparatus according to the present invention.
Figure 14:
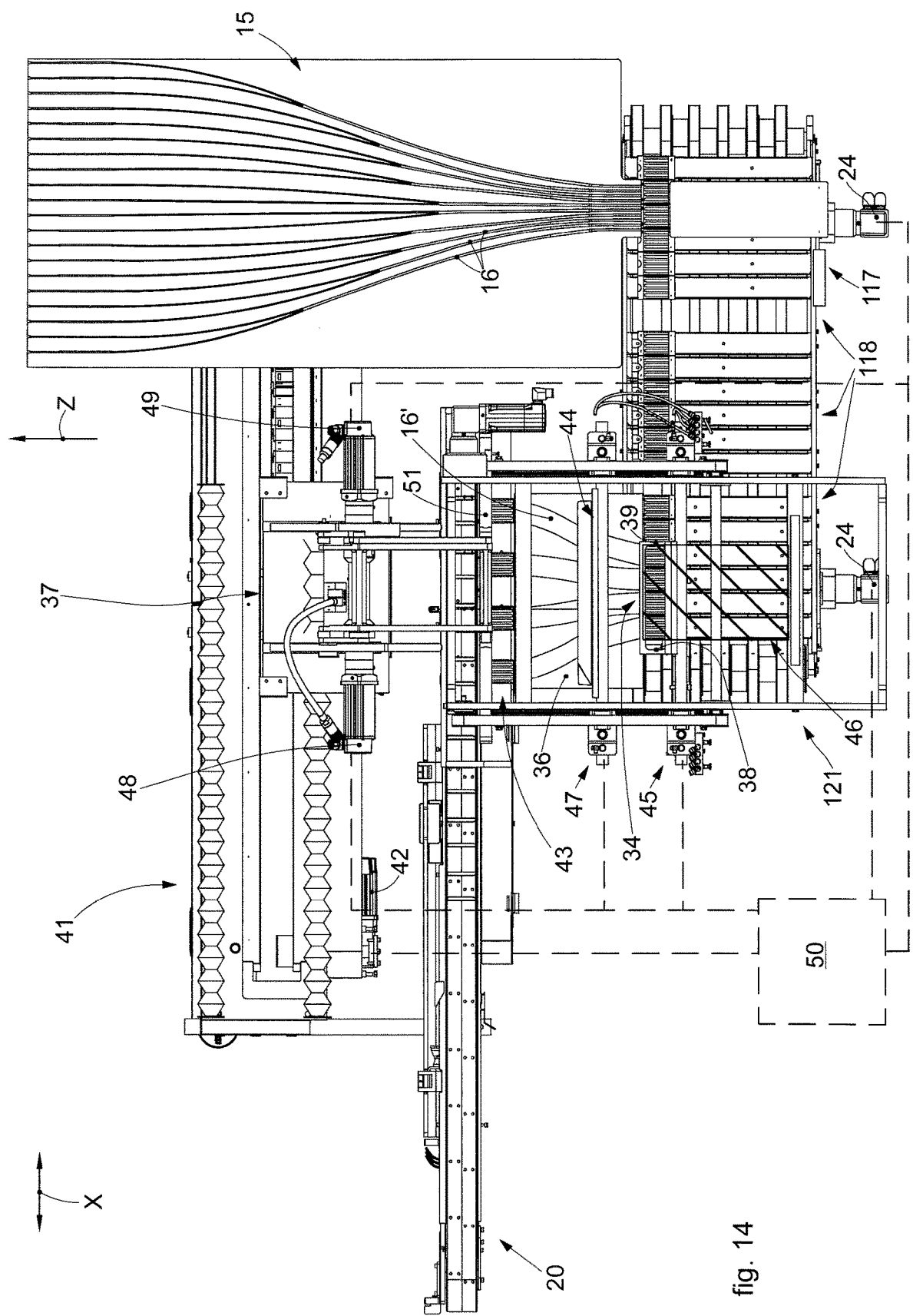
FIG. 14 is a view from above of the packaging apparatus in FIG. 13.

With reference to FIGS. 13 and 14, we will now describe a variant of a packaging apparatus according to the present invention, indicated in its entirety by the reference number 10'.

Elements comprised in the packaging apparatus 10' identical to corresponding elements included in the packaging apparatus 10 will be indicated with the same reference numbers and will not be described again below.

Unlike the packaging apparatus 10, which operates in a cadenced manner with an indexed step-wise movement of the mobile members, the packaging apparatus 10' can operate in a continuous functioning.

This is possible because the packaging apparatus 10' comprises a mobile slider 37 which is bi-directionally movable in the transfer direction X parallel to the movement direction of the transfer drawers 118.

Consequently, the mobile slider 37 is also mobile parallel to the movement direction of the housing drawers 119 on the movement member 20, so as to "follow" them.

The apparatus 10' comprises a guide unit 41 along which the mobile slider 37 can slide parallel to the transfer direction X. The apparatus 10' also comprises a drive device 42 (FIG. 14), such as for example an electric motor, which is associated with the guide unit 41 to command the movement of the mobile slider 37 in the transfer direction X.

It is obvious that the speed of movement of the mobile slider 37 parallel to the transfer axis X must be operatively correlated to the speed of advance of the mobile element 25 and the movement member 20.

The mobile slider 37 comprises a delivery zone 43 configured to temporarily receive the second number N2 of sachets 11 and from which the second number N2 of sachets 11 is introduced into one or more of the housing drawers 119, which are also mobile along the transfer direction X to convey the sachets 11 to the secondary packaging unit 113.

The delivery zone 43 can optionally comprise a plurality of housing seatings, in each of which a single or coupled sachet 11 can be housed.

The packaging apparatus 10' comprises a transfer member 51 which is configured to transfer the sachets 11 from the delivery zone 43 to the housing drawers 119.

The transfer member 51 is installed on an articulated mechanism 52, for example comprising a double articulated arm structure. The articulated mechanism 52 is connected to the mobile slider 37 and is thus mobile together with the latter.

The packaging apparatus 10' comprises a first actuator element 48 and a second actuator element 49 configured to move the articulated mechanism 52.

The first actuator element 48 and the second actuator element 49 are configured to confer on the transfer member 51 respectively a movement in the delivery direction Z and in a vertical direction K.

In this embodiment, the electronic management unit 50 commands the movement of the mobile slider 37 and the transfer member 51 so that their movement takes place in a reciprocally coordinated manner, and also coordinated with the movement of the housing drawers 119.

The further operating lines 16' are conformed as guides to convey the sachets 11 arriving from one or more transfer drawers 118 to the housing drawers 119. Since the apparatus 10' is configured to transfer the sachets to several housing drawers 119 at the same time, for example, to four housing drawers 119 (as depicted in the embodiment shown), a corresponding number of operating lines 16' is made on the delivery plane 36, that is, in this case, four operating lines 16'.

In some embodiments, like the one shown, the operating lines 16' can have a divergent development. In this case, the apparatus 10' comprises an auxiliary removal element 44 configured to assist the removal element 34 during the removal of the sachets 11. The auxiliary removal element 44 has an amplitude measured along the axis X greater than that of the removal element 34. The amplitude of the auxiliary removal element 44 is such that it allows it to guide the sachets 11 as far as the delivery zone 43, that is, it is such that the auxiliary removal element 44 operatively overlaps the removal lines 16' throughout the extension of their path. The sachets 11 are thus guided for an initial portion of their path on the delivery plane 36 in the delivery direction Z by the removal element 34 and then, for the remaining portion of their path as far as the delivery zone 43, by the auxiliary removal element 44.

The apparatus 10' comprises a first actuator unit 45 which is configured to move the removal element 34 in the delivery direction Z and in the vertical direction K to allow the removal element 34 to engage with and disengage from the sachets 11 in the correct way.

Similarly, the apparatus 10' comprises a second actuator unit 47 which is configured to move the auxiliary removal element 44 in the delivery direction Z and in the vertical direction K to allow the auxiliary removal element 44 to engage with and disengage from the sachets 11 in the correct way.

During use, the removal element 34 removes the sachets 11 from one or more of the transfer drawers 118; subsequently the removal element 34 and the auxiliary removal element 44 guide the sachets 11 on the delivery plane 36 along the operating lines 16' as far as the delivery zone 43.

At this time, the mobile slider 37 is positioned in a position so that housing seatings for the sachets 11 made in the delivery zone 43 are facing the operating lines 16'.

Once the sachets 11 have reached the delivery zone 43, the mobile slider 37 can move in the transfer direction X so that the sachets 11 or groups of sachets 11 present in the delivery zone 43 are positioned exactly facing a housing drawer 119, or to a group of housing drawers 119, which is/are to be filled. The transfer member 51 is then driven to transfer the sachets 11 from the delivery zone 43 to the housing drawers 119 so as to introduce the sachets 11 inside them.

Naturally, depending on the conditions of use of the packaging apparatus 10', the mobile slider 37 can also remain stationary, if the operating speeds of the mobile elements do not require a movement of the mobile slider 37 parallel to the transfer axis X.

The electronic management unit 50 in this embodiment commands the displacement of the transfer drawers 118, the removal elements 34, 44, the mobile slider 37, the transfer member 51 and the housing drawers 119 in a reciprocally coordinated manner.

This embodiment can advantageously be used in particular when each package 40 is configured to receive a small number of sachets 11. In fact, this embodiment of the packaging apparatus 10' allows to maintain good productivity even when it is desired to have a rather large number of transfer travels of the removal member 33 in the unit of time, because a second reduced number N2 of sachets 11 is transferred each time. In fact, the presence of a delivery zone 43 movable together with the mobile slider 37 allows to create a lung or "buffer" which increases the productivity of the apparatus, that is, the number of sachets 11 transferred in the unit of time.

Embodiments of the present invention also concern a method for packaging sachets 11 which comprises:
 a step of supplying the sachets 11 containing a product by means of the primary packaging unit 12;
 a step of transferring the sachets 11 from the primary packaging unit 12 to the secondary packaging unit 13 with the transfer unit 114;
 a step of introducing the sachets 11 into packets 40 by means of a secondary packaging unit 13.

In the supply step, a first number N1 of sachets 11 is also supplied in the transfer drawer 118.

According to one aspect of the method of the present invention, the transfer step provides to move, selectively and independently, along a closed-ring path T, at least three transfer drawers 118 disposed one in succession to the other, between the reception station 117 and the delivery station 121, and between the latter and the reception station 117.

In one embodiment, the transfer step provides to move three transfer drawers 118 selectively and independently of each other in a reciprocally coordinated manner between the reception station 117 and the delivery station 121 and vice versa.

The method also comprises a removal step during which the removal member 33 removes a second number N2 of sachets 11 from one or more transfer drawers 118 to supply them to the secondary packaging unit 13.

In possible implementations, the removal step provides that the second number N2 of sachets 11 are supplied to the secondary packaging unit 13 at the same time, that is, all together in a single removal travel in the delivery direction Z of the removal member 33.

In some embodiments, the method for packaging sachets 11 by means of a packaging apparatus 10' as described above (which functions in continuous operation) also provides the step of moving the mobile slider 37, and hence the delivery zone 43 integrated in it, in the drawing direction X.

According to possible formulations of the present invention, it can be provided that the step of supplying the sachets 11 to a first of the transfer drawers 118 and the step of transferring the first transfer drawer 118 from the reception station 117 to the delivery station 121 have, as a whole, a longer duration in time, or at most the same duration in time, with respect to the emptying time of a second transfer drawer 118 added to the movement time of the second transfer drawer 118 from the delivery station 121 to the reception station 117.

Moreover, this temporal condition allows to correlate the production cadence of the primary packaging unit 12 with that of the secondary packaging unit 13, even though these two units can have different production cadences and sometimes even non-adjustable.

The temporal durations of these steps are directly correlated to the production cadences of the primary packaging unit 12, which influences at least the time of the supply step, and the secondary packaging unit 13 which influences at least the time of the removal step of the sachets 11.

Depending on the temporal duration, during the design step of the packaging apparatus 10, the sizes of each transfer drawer 118 are determined, that is, the capacity of each transfer drawer 118 so that said temporal condition is met.

According to a further formulation of the present invention, the method provides that during the step of removing the sachets 11 from one or more of the transfer drawers 118, at least one transfer drawer 118 is always present in the reception station 117, ready to receive the sachets 11 from the primary packaging unit 12.

According to possible embodiments, the packaging method can also provide, in the removal step, to put two transfer drawers 118 adjacent in the delivery station 121.

According to possible embodiments, the packaging method provides to transfer, on each occasion during the removal step, the second number N2 of sachets 11 from both the two transfer drawers 118.

According to possible embodiments, the packaging method provides that, at each transfer, the second number N2 of sachets 11 to be transferred can be varied. This can be accomplished by transferring the second number N2 of sachets 11 from one or more transfer drawers 118 to the housing drawer 119.

According to one aspect of the method for packaging sachets 11 according to the present invention, prior to the removal step, a step is provided of commanding an actuator 24 by an electronic management unit 50 to take one of the transfer drawers 118 into correspondence with the delivery station 121, so that the active transfer portion 46, that is, that portion that extends over one or more transfer drawers 118 in which the second number N2 of sachets is contained, is operatively aligned with the removal member 33.

In particular, in the method according to the present invention it is provided that taking one of the transfer drawers 118 to the delivery station 121 comprises the step of positioning the transfer drawer 118 so that the wall 31, 32 of the transfer drawer 118 that delimits the active transfer portion 46 is substantially aligned with at least one of the lateral walls 38, 39 of the removal element 34.

In possible implementations, where the second number N2 of sachets is equal to the first number N1 of sachets, the wall is one of the lateral walls 32.

In possible implementations, where the second number N2 of sachets is lower or higher than the first number N1 of sachets, the wall is one of the dividing walls 31 of the transfer drawer 118 disposed in the delivery station 121 or the next transfer drawer 118 adjacent to it. This is the case with all the sequences shown by way of example in FIGS. 5-12, described below.

This aspect of the method according to the present invention is suitable to be implemented both in the packaging apparatus 10 having a step-wise functioning, and also in the version of the transfer apparatus 10' with a continuous functioning.

We will now describe by way of example some sequences of possible implementations of the packaging method according to the present invention, with particular reference to FIGS. 5-12.

As can be seen, in all of these sequences shown by way of example, the method according to the invention is implemented, wherein one of the walls 31, 32 of one of the transfer drawers 118 disposed in the delivery station 121 is substantially aligned with at least one of the lateral walls 38, 39 of the removal element 34, in particular with the second lateral wall 39. The wall can be a dividing wall 31 or an end wall 32, and is that wall that delimits the portion of the transfer drawer or drawers 118 which contains the second number N2 of sachets, that is, the active transfer portion 46. In other words, the wall 31, 32 is disposed substantially along a segment of the perimeter of the active transfer portion 46.

According to possible example embodiments of the transfer method, shown in FIGS. 5-8, in the case where each transfer drawer is conformed to contain a first number N1 of five sachets and it is intended to transfer a second number N2 of three sachets to each housing drawer 119, it is necessary to put two transfer drawers 118 adjacent in the delivery station 121.

In this way, a transfer drawer 118 is always available in the reception station 117, ready to receive a first number N1 of sachets 11 from the primary packaging unit 12, and at the same time to provide a desired second number N2 of sachets 11 at exit from the delivery station 121, maintaining production continuity.

In particular, according to one advantage of the present invention, transfer efficiency can always be kept to a maximum since, unlike known packaging apparatuses (FIG. 1), the transfer drawer 118 in the reception station 117 can always be completely filled, so there are no problems of movement.

With reference to FIGS. 9A-9D and 10A-10D, examples can be seen of operating sequences in which the removal element 34 is sized according to the second number N2 of sachets 11 to be removed. As this number varies, the removal element 34 needs to be replaced with another element of appropriate size.

In the example shown in FIGS. 9A-9D, each transfer drawer 118 is conformed to contain a first number N1 of ten sachets and is intended to transfer a second number N2 of three sachets to each housing drawer 119. It should be noted that in the reception station 117, the sachets 11 are fed in groups of five. In this example, the delivery device 15 simultaneously delivers a number N* of five sachets 11.

In the example shown in FIGS. 10A-10D, each transfer drawer 118 is conformed to contain a first number N1 of ten sachets and is intended to transfer a second number N2 of six sachets to each housing drawer 119. It should be noted that in the reception station 117, the sachets 11 are fed in groups of five. In this example, the delivery device 15 therefore simultaneously delivers a Number N* of five sachets 11.

Figure 10A:
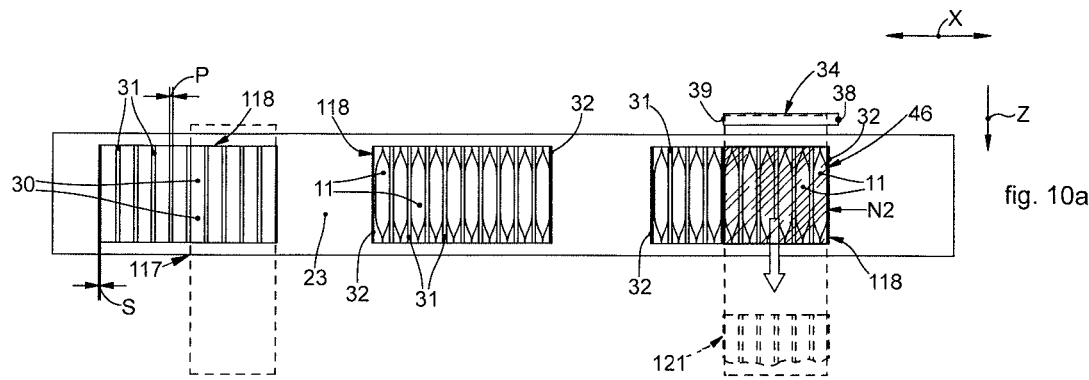
Figure 10B:
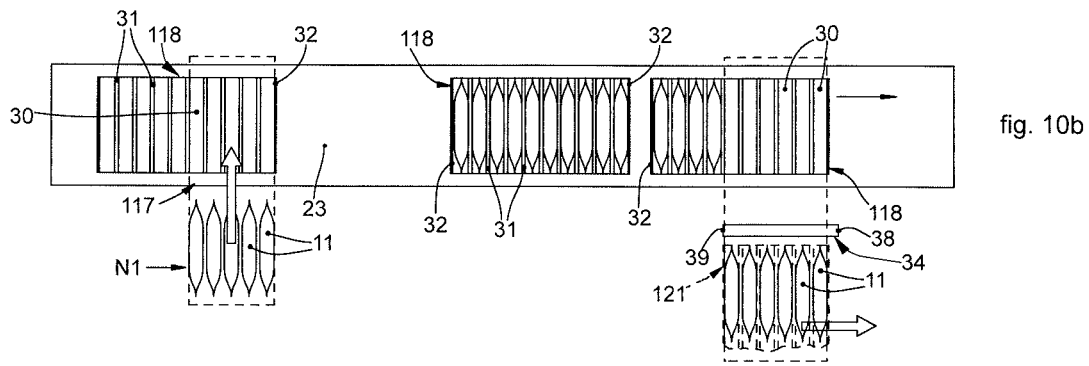
Figure 10C:
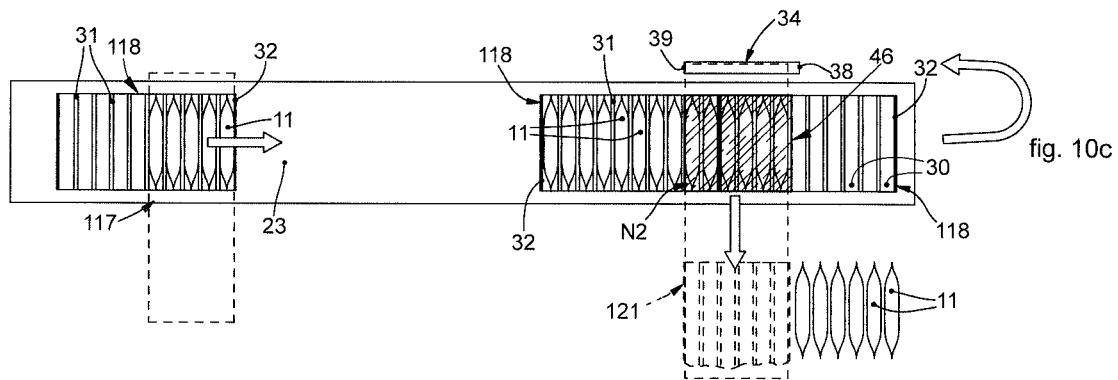
Figure 10D:
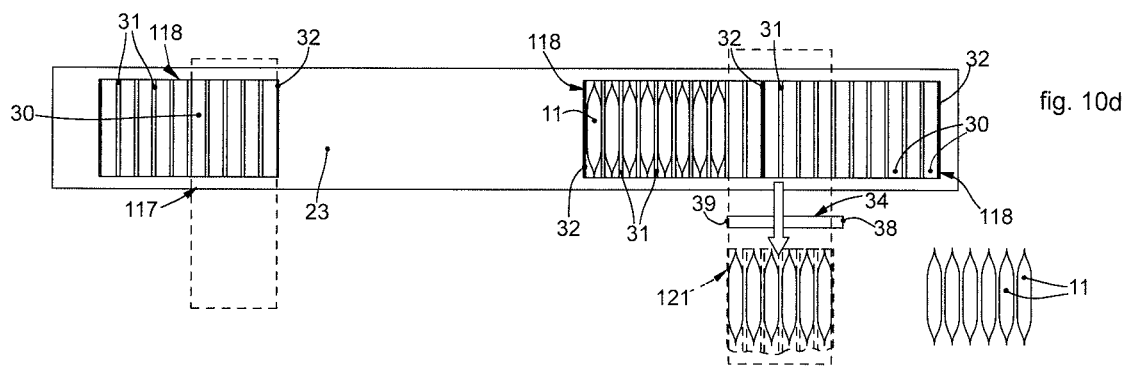
Figure 11A:
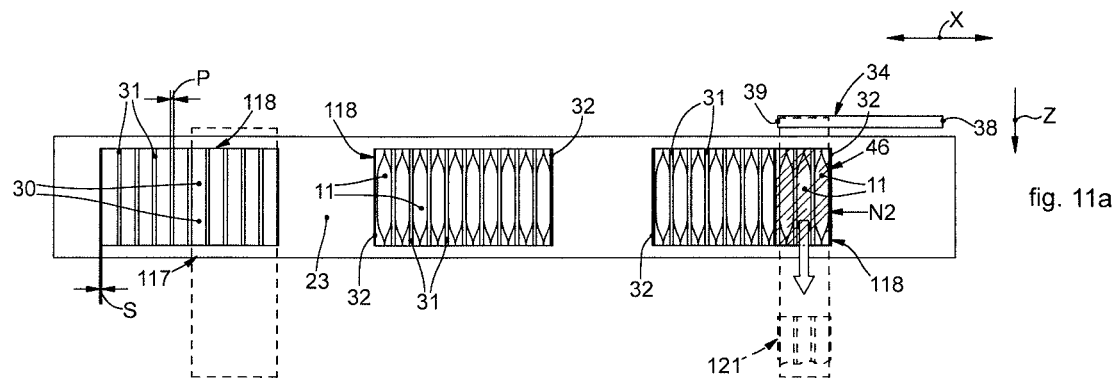
Figure 11B:
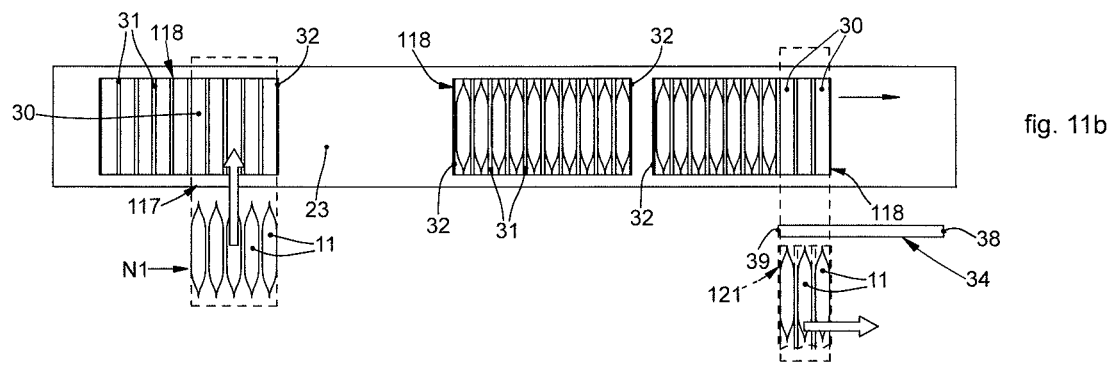
Figure 11C:
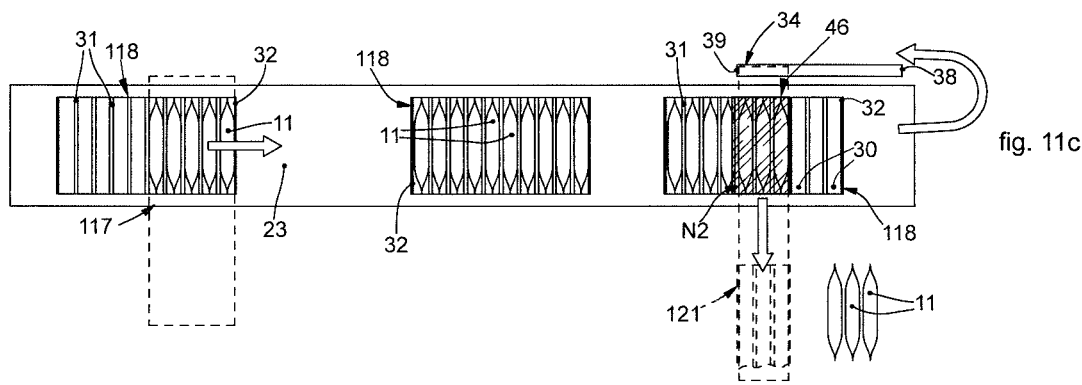
Figure 11D:
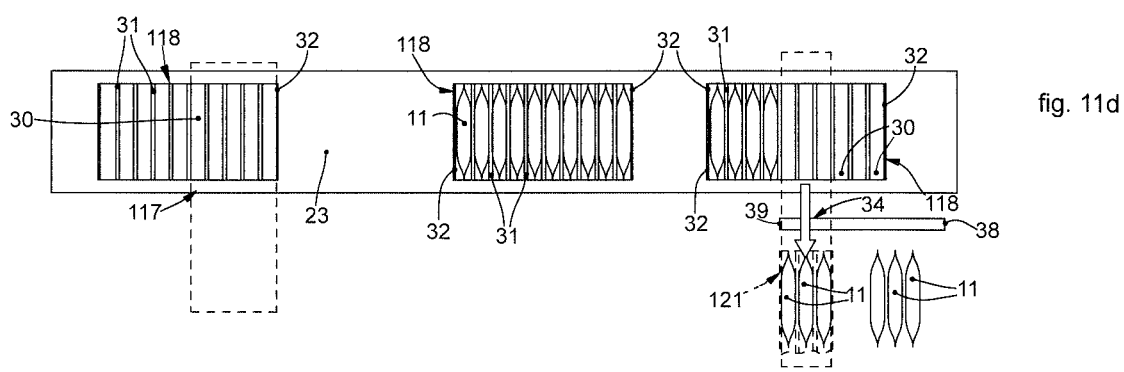

With reference to FIG. 10C, a removal step is shown of a second number N2 of sachets 11 in which the sachets are removed from both transfer drawers 118 which are disposed adjacent in the delivery station 121. In this case, the active transfer portion 46 extends over, and is comprised in, both of the transfer drawers 118.

With reference to FIGS. 11A-11D and 12A-12D, examples of operational sequences are visible in which the removal element 34 is sized during the design stage of the packaging apparatus 10, 10'. Consequently, it is not necessary to replace the transfer element 34 when varying the second number N2 of sachets 11 to be removed. Consequently, in a preliminary design stage of the packaging apparatus 10, 10', the removal element 34 is sized as a function of a second number N2 of sachets 11 that can be removed, as a maximum number, for each removal cycle.

In the example shown in FIGS. 11A-11D, each transfer drawer 118 is conformed to contain a first number N1 of ten sachets and is intended to transfer a second number N2 of three sachets to each housing drawer 119. It should be noted that in the reception station 117, the sachets 11 are fed in groups of five. In this example, the delivery device 15 simultaneously delivers a number N* of five sachets 11.

In the example shown in FIGS. 12A-12D, each transfer drawer 118 is conformed to contain a first number N1 of ten sachets and is intended to transfer a second number N2 of six sachets to each housing drawer 119. It should be noted that in the reception station 117, the sachets 11 are fed in groups of five. In this example, the delivery device 15 simultaneously delivers a Number N* of five sachets 11.

Figure 12A:
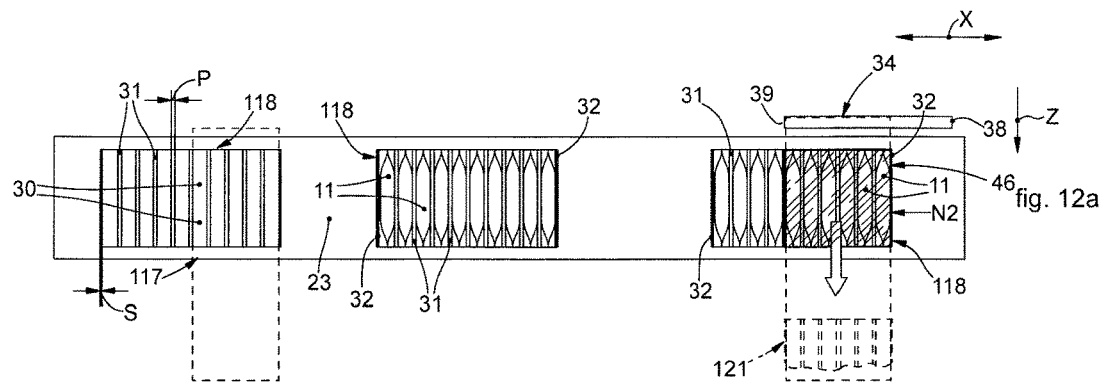
Figure 12B:
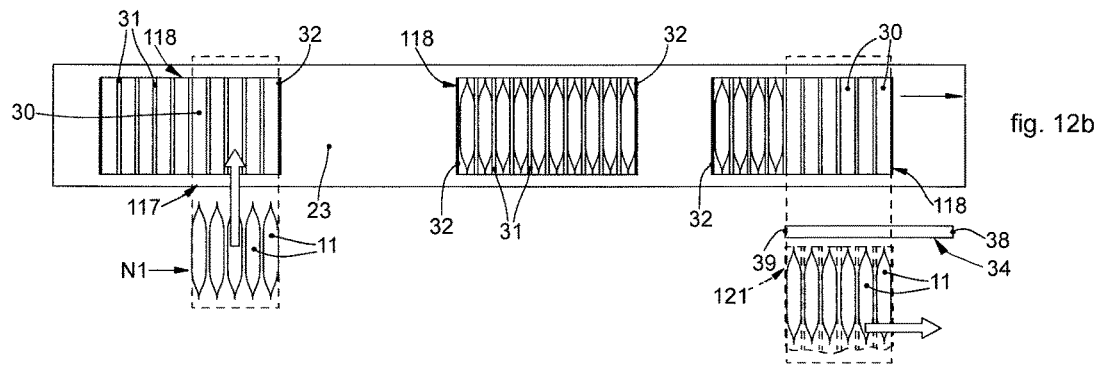
Figure 12C:
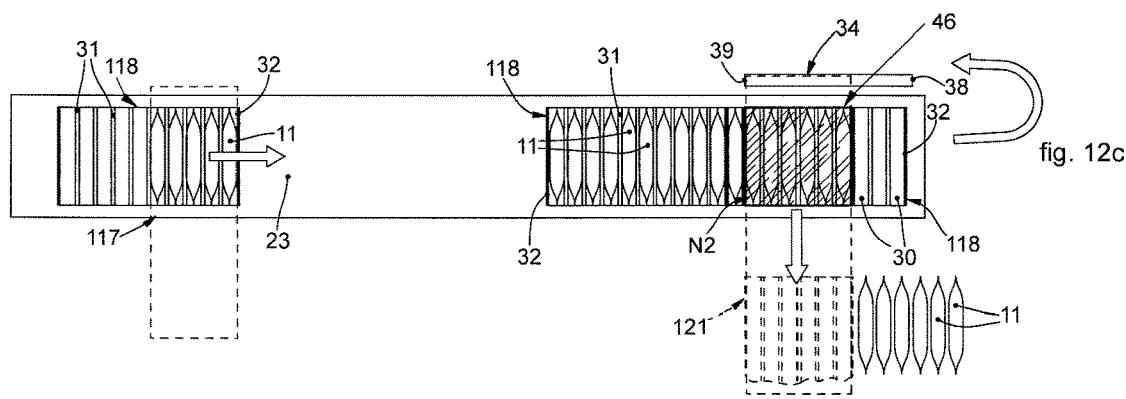
Figure 12D:
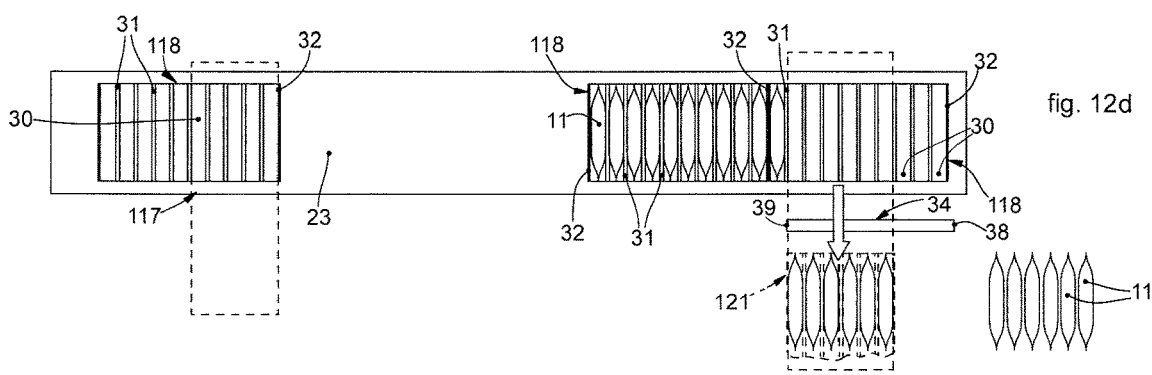

With reference to FIG. 12C, a removal step of a second number N2 of sachets 11 is visible, in which the sachets are removed from both transfer drawers 118 which are disposed adjacent in the delivery station 121. In this case, the active transfer portion 46 extends over, and is comprised in, both transfer drawers 118.

The exemplifying sequences described above as in FIGS. 5-12 allow to highlight the great flexibility and versatility of the packaging apparatus 10, 10' according to the present invention, and the corresponding packaging method.

In fact, thanks to the packaging apparatus and method of the present invention, the user can advantageously set the apparatus with great ease, so as to pack the sachets 11 according to the desired disposition, and can easily modify the operating parameters of the electronic management unit 50, when it is necessary to modify one or the other of the first number N1 and the second number N2 of sachets 11.

In some implementations (FIGS. 11 and 12), as we said, it is also possible to vary the second number N2 of sachets 11, simply by varying the operating parameters of the electronic management unit 50, without needing to replace any component of the apparatus, not even the removal element 34.

It is clear that modifications and/or additions of parts can be made to the packaging apparatus and method as described heretofore, without departing from the field and scope of the present invention.

It is also clear that, although the present invention has been described with reference to some specific examples, a person of skill in the art shall certainly be able to achieve many other equivalent forms of packaging apparatus and method, having the characteristics as set forth in the claims and hence all coming within the field of protection defined thereby.

The invention claimed is:

1. An apparatus for packaging sachets, the apparatus comprising:
   a primary packaging unit configured to supply said sachets containing a product;
   a secondary packaging unit configured to introduce said sachets into packages;
   a transfer unit interposed between said primary packaging unit and said secondary packaging unit in order to transfer said sachets from said primary packaging unit to said secondary packaging unit,
   wherein said primary packaging unit comprises a delivery device of said sachets, disposed at exit from said primary packaging unit and configured to supply a plurality of sachets, also coupled, to said transfer unit, said delivery device comprising one or more operating lines along which said sachets can slide until they reach the transfer unit,
   wherein said transfer unit comprises at least three transfer drawers disposed one after the other, selectively movable independently with respect to each other along a closed-ring path between a reception station and a delivery station and between said delivery station and said reception station, each of said transfer drawers being configured to contain a first number of said sachets and said transfer unit comprising a removal member associated with said delivery station and configured to remove from one or more of said transfer drawers a second number of said sachets and to supply them to said secondary packaging unit,
   wherein said first number is greater or smaller than said second number,
   wherein said delivery device comprises a number of operating lines that is equal to said first number of sachets or less than said first number of sachets so that said first number is a multiple of said number of operating lines,
   wherein said transfer unit comprises an electronic management unit that coordinates and commands the movement of said transfer drawers in a coordinated manner with respect to each other and of said transfer drawers with the movement of said removal member,
   wherein said electronic management unit is configured to command at least one actuator to move the transfer drawers independently of each other so that they take at least one of said transfer drawers into a position such that an active transfer portion comprised in said transfer drawer is operatively aligned with said removal member, and
   wherein said active transfer portion is that portion of one or more of said transfer drawers in which said second number of sachets is contained so that any remaining sachets contained in said transfer drawers exceeding said second number, that is, the difference between said first number and said second number are contained in an area of said transfer drawers outside said active transfer portion.

2. The apparatus of claim 1, wherein each of said transfer drawers is provided with lateral walls and dividing walls located between said lateral walls, and in that said lateral walls and said dividing walls define housing seatings configured to house one or more of said sachets.

3. The apparatus of claim 2, wherein said lateral walls have an equivalent thickness that is substantially half of the equivalent thickness of said dividing walls.

4. The apparatus of claim 1, wherein at least one of said transfer drawers comprises at least two transfer sectors each configured to transfer a plurality of sachets which is less than said first number, and in that said transfer sectors are reciprocally connected in an articulated manner in order to follow said closed-ring path.

5. The apparatus of claim 1, wherein said apparatus is configured to dispose, move and package said sachets, keeping them on the edge, and wherein said removal member comprises a removal element to act on at least one upper portion of said sachets, and wherein said apparatus further comprises a movement device configured to move said removal element from said delivery station to said secondary packaging unit.

6. The apparatus of claim 1, wherein said transfer drawers are moved independently by means of a movement member provided with an actuator and a mobile element connected to each of said transfer drawers.

7. The apparatus of claim 1, further comprising a mobile slider that is mobile two-directionally in a transfer direction parallel to the movement direction of said transfer drawers and in that said mobile slider comprises a delivery zone configured to temporarily receive said second number of sachets and from which said second number of sachets is introduced into one or more housing drawers, which are also mobile in said transfer direction to convey said sachets toward said secondary packaging unit.

8. The apparatus of claim 1, wherein said transfer unit comprises three transfer drawers disposed one after the other.

9. A method for packaging sachets, the method comprising:
   supplying said sachets containing a product by means of a primary packaging unit;
   transferring said sachets from said primary packaging unit to a secondary packaging unit with a transfer unit comprising at least three transfer drawers each configured to receive a first number of said sachets, wherein said transfer step provides to move, selectively and independently, along a closed-ring path said transfer drawers disposed one after the other, between a reception station and a delivery station, and between said delivery station and said reception station;

introducing said sachets into packages by means of said secondary packaging unit, and removing a second number of said sachets from one or more of said transfer drawers in order to supply them to said secondary packaging unit by way of a removal member, wherein said first number is greater or smaller that said second number;

wherein, before said removal step, the method comprises commanding an actuator, by means of an electronic management unit, to take at least one of said transfer drawers into correspondence with said delivery station so that an active transfer portion comprised in at least one of said transfer drawers is operatively aligned with said removal member; said active transfer portion being that portion of one or more of said transfer drawers in which said second number of sachets is contained so that any remaining sachets contained in said transfer drawers exceeding said second number, that is, the difference between said first number and said second number are contained in an area of said transfer drawers outside said active transfer portion, wherein said primary packaging unit comprises a delivery device of said sachets, disposed at exit from said primary packaging unit and configured to supply a plurality of sachets, also coupled, to said transfer unit, said delivery device comprising one or more operating lines along which said sachets can slide until they reach the transfer unit, and wherein said delivery device comprises a number of operating lines that is equal to said first number of sachets or less than said first number of sachets so that said first number is a multiple of said number of operating lines.

10. The method of claim 9, wherein said taking of one of said transfer drawers into the delivery station further comprises the step of positioning said transfer drawer so that one wall of said transfer drawer that delimits said active transfer portion is substantially aligned with at least one of either a first lateral wall and a second lateral wall of a removal element comprised in said removal member, wherein said first lateral wall and said second lateral wall are lateral walls respectively disposed at a greater and a lesser distance from said reception station.

11. The method of claim 9, wherein said step of supplying the sachets to a first of said transfer drawers and said step of transferring said first transfer drawer from said reception station to said delivery station have overall a longer duration in time than, or at the most equal to, the duration in time of emptying out a second of said transfer drawers added to the movement time of said second transfer drawer from said delivery station to said reception station.

12. The method of claim 9, wherein, during said removal step of said sachets from one or more of said transfer drawers, the method further comprises taking at least one transfer drawer in said reception station to receive said sachets from said primary packaging unit.

13. The method of claim 9, wherein, during said removal step, the method further comprises placing two of said transfer drawers adjacent to each other in said delivery station and transferring, if necessary, said second number of said sachets from both said transfer drawers.

14. The method of claim 1, wherein said removal step provides that said second number of said sachets is supplied to said secondary packaging unit simultaneously, that is, all together in a single travel in a delivery direction of said removal member.

* * * * *